United States Patent Office 3,154,288
Patented Oct. 27, 1964

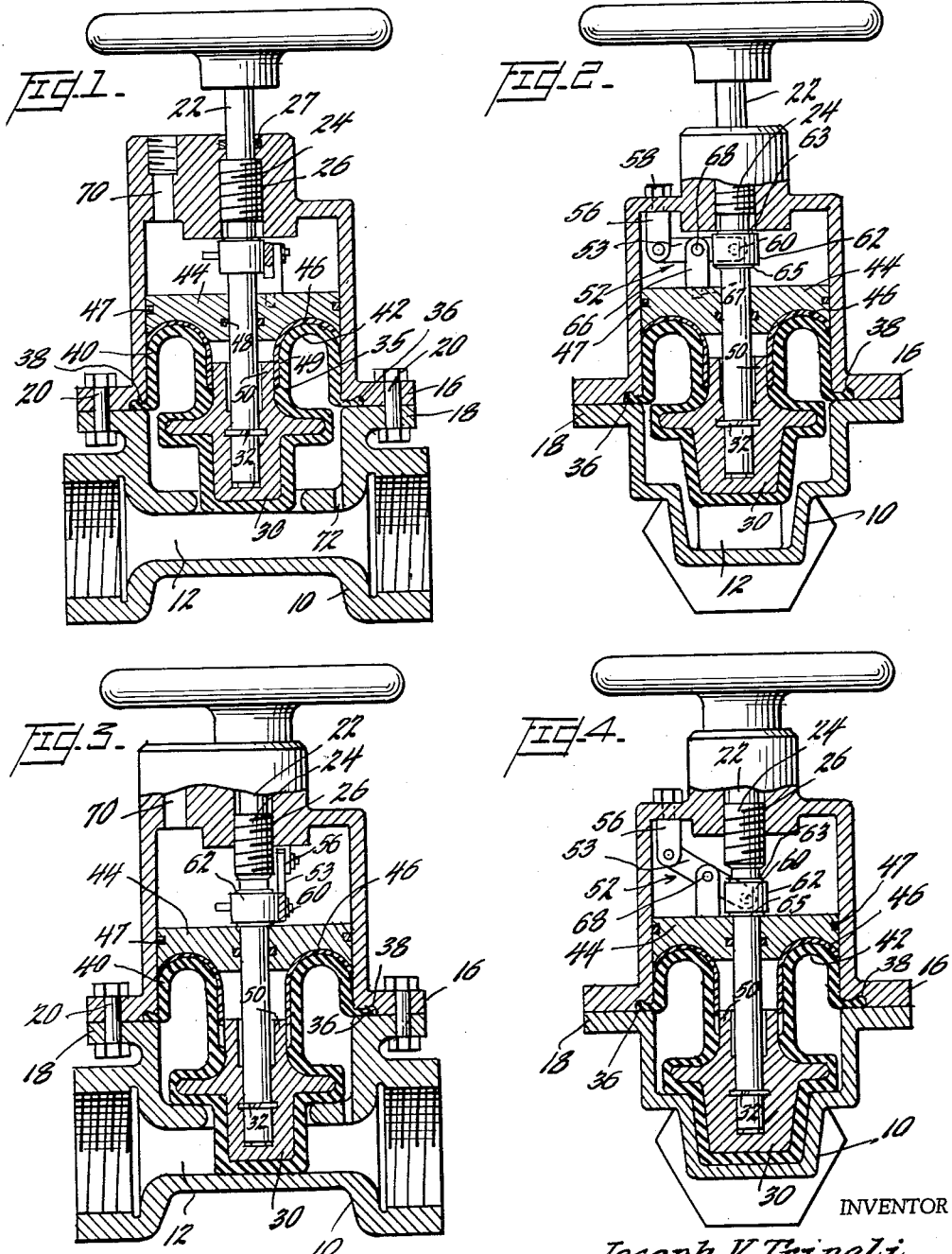

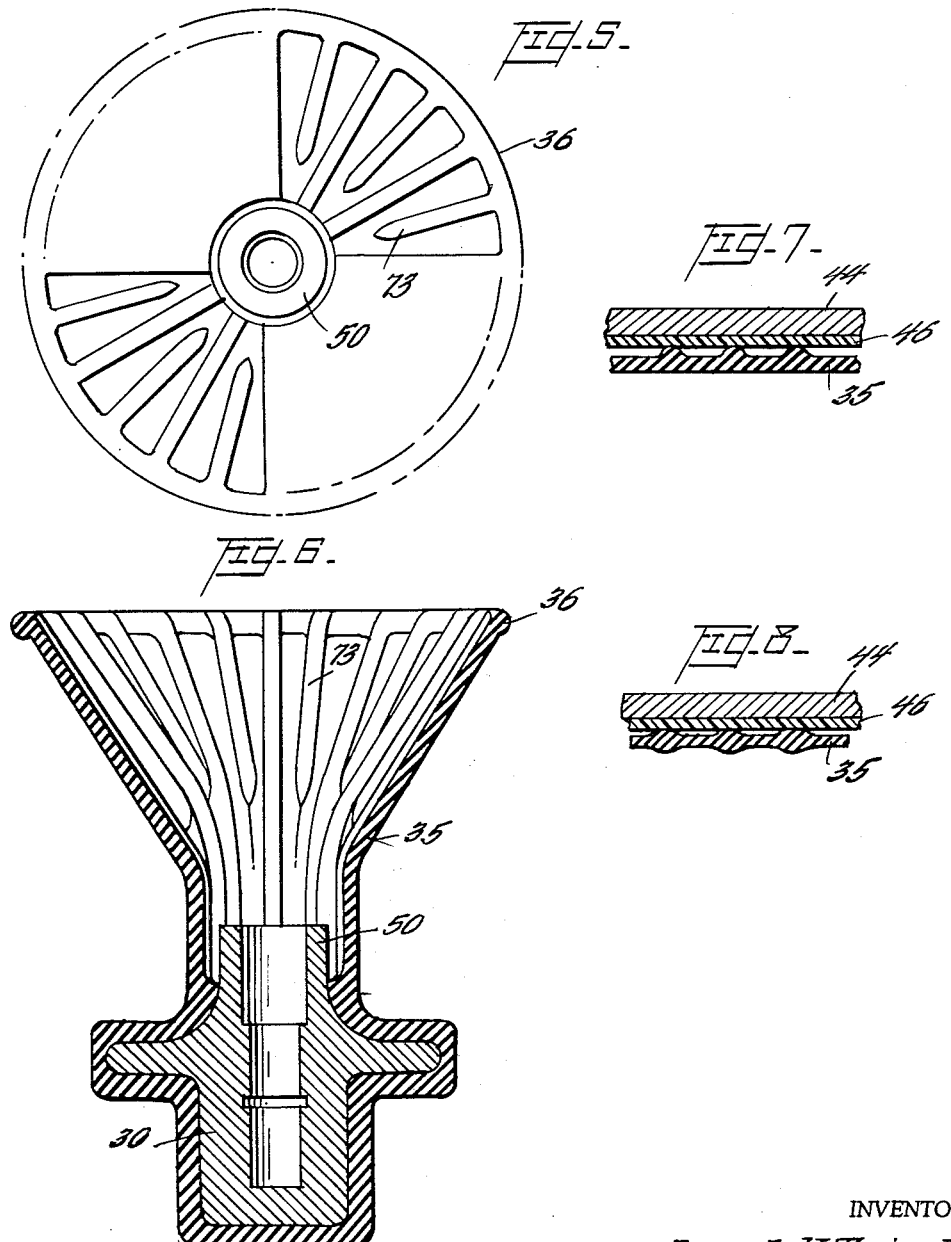

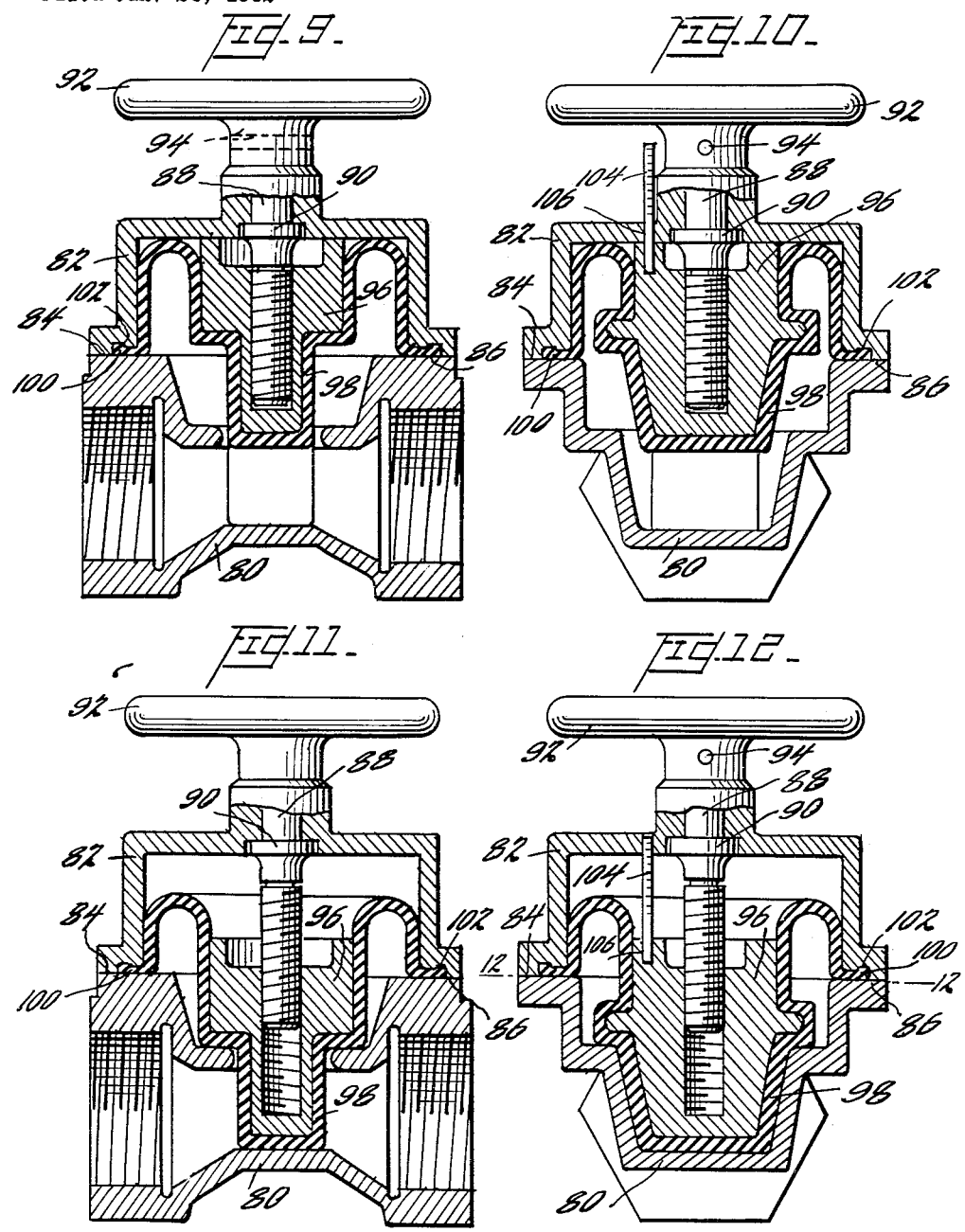

1

3,154,288
DIAPHRAGM VALVE
Joseph V. Tripoli, 72 Doncaster Road, Kenmore 17, N.Y.
Filed Jan. 24, 1962, Ser. No. 168,410
8 Claims. (Cl. 251—331)

This invention relates to a gate valve of the diaphragm type and, more particularly, to an improved valve construction which provides for longer wear of the diaphragm while permitting the control of fluids under higher pressure than would be possible with diaphragm valves employing diaphragms of similar size and material.

Priorly, numerous forms of diaphragm valves have been provided for the control of the flow of fluids. For example, it is known to employ in a diaphragm type valve a linkage connected to concentric backing members to control proportional movement of the backing members as the diaphragm is flexed through its center line position by the valve operator which is coupled to the backing members. In this known type of construction, however, the primary wear of the diaphragm is caused by the flexing of the diaphragm. During the flexing of a diaphragm, which is usually comprised of at least one layer of fabric and one layer of flexible material such as rubber, the junction between the fabric and the rubber experiences heat due to the unequal elongation of the fabric and rubber. In other words, the rubber might be compressed while the fabric is under tension thus causing friction at the junction between the fabric and the rubber. Still another disadvantage in this form of construction arises from the inability of the diaphragm followers to remain in continuous contact with the diaphragm throughout the surface area between the edge of the diaphragm and the diaphragm actuator. It is necessary that the diaphragm followers have curved surfaces since they engage the diaphragm with a rolling contact. This rolling contact necessarily results from the proportional movement of the diaphragm followers under the control of a link connected between the bonnet and the diaphragm operator. The inability of these followers to define a smooth contact surface throughout the area between the flanges and the diaphragm operator causes additional wear of the diaphram and, further, permits the fluid being controlled to flex the diaphragm into the small angular spaces between adjacent diaphragm followers.

Accordingly, it is an object of this invention to provide an improved diaphragm type valve construction.

It is another object of this invention to provide an improved diaphragm type valve construction which obviates all of the above-mentioned disadvantages.

It is still another object of this invention to provide an improved diaphragm type valve construction in which the diaphragm is supported by a smooth surface between the bonnet and the gate member to eliminate flexing of the diaphragm member.

It is still another object of this invention to provide a diaphragm type valve with a proportional follower for the diaphragm which continually engages the diaphragm in a smooth continuous line between the bonnet and the gate member for all positions of the gate member.

It is still another object of this invention to provide a diaphragm type valve with a diaphragm having radial ribs on the inner surface and cooperating guide means which engage these ribs at all times to provide support for the diaphragm while permitting sliding movement of the diaphragm relative to the guide means.

It is another object of this invention to provide a diaphragm type valve with a diaphragm which has sufficient length in a radial direction to permit the diaphragm to remain in a U shape for all positions of the valve operator such that the diaphragm never flexes beyond its own center line.

It is a further object of this invention to provide in a diaphragm type valve an annular diaphragm, the outer periphery of which is secured between the valve body flange and the valve bonnet flange, the inner periphery of which may be secured to the gate member or to a follower which is coupled to the gate member, which diaphragm has a sufficient diameter to permit the diaphragm to maintain a U shape for all positions of the valve gate.

Briefly, in accordance with one illustrative embodiment of this invention, a diaphragm valve is provided with a gate mounted on the end of a stem movably mounted in the valve bonnet to move in a direction to permit the gate to move into and out of the fluid passage through the gate body. Advantageously, the gate member is inclosed in a diaphragm which extends beyond the center line defined by the flanges at the junction of the bonnet and the body. The cross section of the diaphragm above this center line resembles a pair of inverted U's with the outer edges of the U's secured between the flanges. Advantageously, the valve includes guide means engaging the inner surface of the diaphragm in a continuous line between the bonnet and the gate member and this guide means is actuated through a proportional linkage to move at the same rate as the diaphragm in such a manner that the diaphragm slides along the guide means rather than flexing as is ordinarily the case in the prior art types of devices. The inverted U shaped cross section never passes beyond the center line of the diaphragm as defined by the junction of the body flange and the bonnet flange.

According to another illustrative embodiment of this invention, a diaphragm type valve is provided with a valve body and a bonnet having a flange which cooperates with a flange on the valve body, a gate member mounted for reciprocation in the bonnet, and a diaphragm having its outer periphery secured between the body flange and the bonnet flange and extending over the outer surface of the gate member and having a sufficient diameter to permit the diaphragm to maintain a substantial U shaped cross section between the gate member and the bonnet for all positions of the gate member. Advantageously, the diaphragm may have a sufficient diameter to contact the inner walls of the bonnet when the gate member is in its open position, thus permitting the inner walls of the bonnet to support the diaphragm when fluid is flowing through the valve body.

In accordance with still another illustrative embodiment of this invention, an annular diaphragm of a diaphragm type valve has its outer periphery secured between the bonnet flange and the valve body and its inner periphery secured to the gate member, the diaphragm having sufficient diameter to permit the diaphragm to maintain a U shaped cross section between the gate member and the bonnet for all positions of the gate member. In this instance, the gate member makes direct contact with the valve body to close the fluid passage through the valve body.

According to one feature of this invention, the inner surface of the diaphragm is provided with a series of radial ridges, which ridges engage the guide means in sliding contact to reduce the wear of the diaphragm by reducing the area of contact between the guide means and the diaphragm while permitting a thinner diaphragm construction for a given fluid pressure.

It is another feature of this invention to provide a diaphragm valve with a guide means slideably mounted on the stem, or spindle, and a proportional linkage connected between the stem, bonnet, and guide means to cause the guide means to move at a rate corresponding to the rate of movement of the diaphragm as the diaphragm slides along the guide means without flexing.

It is still another feature of this invention to provide in a diaphragm type valve a diaphragm having an outer periphery which is secured between the valve body flange and the valve bonnet flange and extends over the entire outer surface of the gate member and has a sufficient diameter to maintain a substantially U shaped cross section for all positions of the gate member wherein the diaphragm does not flex beyond its own center line throughout the movement of the gate member.

It is still another feature of this invention to provide in a diaphragm type valve an annular diaphragm, the outer periphery of which is secured between the valve body flange and the valve bonnet flange, and the inner periphery of which is secured to the gate member, the diaphragm having a sufficient diameter to maintain a substantially U shaped cross section for all positions of the valve gate.

These and various other objects and features of the invention will be more clearly understood from a reading of the detailed description of the invention in conjunction with the drawing in which:

FIGURES 1 and 2 are views, in elevation, partly in section, of one illustrative embodiment of this invention showing the valve in its open position, the views being taken at right angles relative to each other;

FIGURES 3 and 4 are views corresponding to FIGURES 1 and 2, respectively, showing the valve in its closed position;

FIGURE 5 is a view, in section, of the gate member and the diaphragm;

FIGURE 6 is a plan view of the diaphragm and gate member;

FIGURE 7 is a detailed view showing the cooperation between the diaphragm and the guide means under a relatively low fluid pressure;

FIGURE 8 is a detailed sectional view corresponding to FIGURE 7 showing the diaphragm under a relatively high fluid pressure; and FIGURES 9, 10, 11, and 12 are views, in elevation, partly in section, of still another illustrative embodiment of this invention, FIGURES 9 and 10 being views taken along perpendicular planes with the gate member in its open position, FIGURES 11 and 12 being views taken along planes corresponding to those of FIGURES 9 and 10, respectively, except that the gate is in the closed position.

As depicted in FIGURES 1 and 2, the valve body 10 includes a fluid passage 12 therethrough with a bonnet 14 mounted perpendicular to the axis of the body 10 by means of flange 16 which cooperates with body flange 18. These flanges are secured together by convenient means, such as by nut and bolt assemblies 20. A stem, or spindle, 22 is mounted in the bonnet 14 for movement longitudinally of the axis of the spindle. In this particular embodiment, the spindle 22 is provided with threads 24 which cooperate with a threaded portion 26 in the bonnet 14. An O ring 27 is recessed in the upper portion of bonnet 14 and encircles the spindle 22 to define a fluid seal between the bonnet 14 and the spindle 22. A gate, or closing member, 30 is mounted on one end of the spindle 22 by means of a snap ring 32. A handle 33 is mounted on the other end of spindle 22.

A diaphragm 35 has an enlarged portion 36 at the periphery which is secured in a recessed portion 38 on the inner surface of the bonnet 14 by the cooperation of this recessed portion 38 and the adjacent body flange 18. Advantageously, the upper portion, i.e., that portion of the diaphragm above the junction of the flanges, as viewed in FIGURE 1, defines a pair of inverted U's 40 and 42. The diaphragm 35 closely engages the major portion of the outer surface of gate member 30. The valve assembly includes guide means in the form of a guide 44 and a guide insert 46. The guide 44 is an annular member slideably mounted on the stem 22 between the inside wall of the bonnet and the stem. Advantageously, O rings 47 and 48 define fluid seals between the sliding surfaces of the guide and the inner surface of the bonnet and the outer surface of the stem, or spindle. The guide insert is in the form of a surface of revolution defining an arcuate path closely cooperating with and contacting the inner surface of the diaphragm 35. The guide insert 46 is secured to the guide 44 and has a lower portion 49 which slideably engages the upper portion 50 of the gate member 30.

Advantageously, the guide 44 is moved by a proportional link system 52 which includes a lever 53 having one terminal portion engaging a pin 54 held in a yoke 56 secured to the bonnet 14 by means of a nut 58. The other terminal portion of the lever 53 engages a pin 60 on a sleeve 62, which sleeve is secured to the spindle 22 by means of snap rings 63 and 65 to permit relative rotation between the stem 22 and the sleeve 62 while preventing relative longitudinal movement between the stem 22 and the sleeve 62. A yoke 66 is secured to guide 44 by suitable means such as by threads 67 and the other end of the yoke 66 has a pin 68 which engages a point intermediate the ends of the lever 53. Advantageously, the terminal portions of the lever 53 contain oval shaped apertures which cooperate with pins 54 and 60 to permit changes in the distance between these two pins when the gate member is moved in a manner which will be subsequently described.

In accordance with one feature of this invention, the rate at which the guide 44 is moved relative to the rate of movement of the gate member and the connected diaphragm is determined by the location of pin 68 with respect to pins 54 and 60. Thus, if the pin 68 is midway between the stationary pin 54 and pin 60 on sleeve 62, then the guide 44 will move at half the rate of the gate member 30.

The upper portion of the bonnet 14 is provided with a passage 70 for the admission of fluid under pressure into the region between the top of the bonnet and the guide 44. Fluid under pressure in this enclosure counterbalances the force exerted on the gate member and guide and thus facilitates movement of the gate member by reducing the frictional force of the threads 24 upon the threaded portion 26 of the bonnet 14. Also advantageously, the body 10 has a drainage hole, or passage, 72 for the purpose of permitting the drainage of fluids otherwise trapped in the cavity above the gate member 30 and below the diaphragm 35 after the valve closes.

As shown in FIGURES 3 and 4, the gate member is in its lowermost position sealing the passage 12. Advantageously, in this position, the inverted U's 40 and 42 of the diaphragm 35 are still of substantial size and the guide insert 46 is still in continuous contact with the inner surface of the diaphragm 35. Thus, the guide 44 and guide insert 46 are supporting the diaphragm 35 relative to the fluid pressure whether the gate member is in the open or closed position. During the movement of the gate member from the open to the closed position, the guide and the cooperating guide member move at a rate with respect to the rate of movement of the gate member which is inversely proportional to the ratio of the perpendicular distance between pins 54 and 60 to the distance between the pins 54 and 68. Since the ratio represented in this particular embodiment is in the order of two to one, then the guide 44 will move at half the rate of the stem 22. It is, of course, understood that movement of the yoke 66 relative to the lever 53 will produce a proportional increase or decrease of the rate of movement of the yoke 66 relative to the stem 22 depending upon whether the yoke is moved toward or away from pin 60.

As seen in FIGURE 5, the diaphragm 35 has a series of radial ridges, or ribs, 73 which extend from the outside bead 75 to an area immediately adjacent the upper edge of gate member 30. Advantageously, these ribs reduce the amount of friction between the diaphragm 35 and the guide insert 46 to lengthen the life of diaphragm 35 while permitting the diaphragm to slide easily over the inner surface of the guide insert 46.

FIGURE 6 is a plan view of the diaphragm 35 showing beads 75 and radial ribs 73. The cooperation of these ridges and the guide insert 46 might best be described in conjunction with the enlarged sectional views of FIGURES 7 and 8. FIGURE 7 shows the diaphragm 35 under normal pressure and indicates how the ribs 73 support the intermediate portion of diaphragm 35 in relatively spacial relationship, and FIGURE 8 shows the new relationship between the diaphragm 35 and the guide insert 46. In the instance of FIGURE 8, a fluid under a relatively high pressure is pushing upwardly to compress the diaphragm 35 and the associated ribs 73 against the guide insert 46.

This form of valve construction provides numerous advantages. It is impossible to rupture the diaphragm since the diaphragm is supported at all times by the guide insert 46. The cooperation of the guide insert 46 and the ridges 73 facilitates the movement of the diaphragm while permitting the valve to operate with variable fluid pressure. A fluid may be introduced between the upper portion of the guide and the bonnet to reduce the pressure differential between the valve and the fluid passing through the conduit thus facilitating the movement of the valve. The valve has the ability to take any working pressure; it is only limited by its casing with regard to working pressure because the guide insert continuously backs the diaphragm. The sliding cooperation between the diaphragm and guide insert prevents flexing and reduces internal stresses in the diaphragm, thereby reducing the generation of heat which usually builds up in a flexing diaphragm from continuous cycling.

Referring now to FIGURES 9, 10, 11, and 12, there is shown another illustrative embodiment of this invention. In this particular embodiment, the valve body 80 is joined to a valve bonnet 82 at the junction of the bonnet flange 84 and the body flange 86. A spindle 88 is rotatably mounted in the bonnet 82 and held in position by an enlarged cylindrical portion 90 within the bonnet 82 and a handle 92 which is secured to the spindle by means of key 94. A gate member 96 threadably engages the lower portion of spindle 88 by means of threads on the spindle. A diaphragm 98 has its outer periphery 100 secured between the bonnet flange 84 and the body flange 86 and, advantageously, has a larger cross section adjacent the periphery 100, which larger cross section fits in a recess 102 of the bonnet flange 84. When the gate is in its open position, as shown in FIGURES 9 and 10, the diaphragm has a U shaped cross section in the portion between the outer periphery 100 and the gate member 96 which permits the diaphragm closely to conform to the inner surface of the bonnet 82 and thus support the diaphragm against fluid pressure. As best seen in FIGURES 10 and 12, a gate position indicator rod 104 is connected to the gate member 96 and passes through an aperture 106 in the bonnet 82 to provide a visual indication of the agitation of the gate position. Thus, when the gate is in its uppermost position, as shown in FIGURE 10, the rod 104 projects a substantial distance beyond the bonnet 82. If, however, the gate is in its closed position, as shown in FIGURE 12, the rod 104 is in its lowermost position with respect to the bonnet 82. Advantageously, the diaphragm 98 maintains its U shaped cross section in the portion between the gate member 96 and the bonnet 82 through all positions of the gate member and including the closed position, as best seen in FIGURES 11 and 12. Because this portion of the diameter of the diaphragm is much greater than the distance between the gate member 96 and the bonnet 82, this portion of the diaphragm does not flex through the center line of the diaphragm. It is this particular feature which reduces the wear on the diaphragm as compared to those which flex through their own center line during movement of the gate member. The term "center line of the diaphragm" is employed throughout this specification to designate a line passing through the valve between the bonnet flange and the body flange such as line 12—12 in FIGURE 12.

While I have shown and described one illustrative embodiment of this invention, it is understood that the concepts thereof could be applied to other embodiments without departing from the spirit and scope of this invention.

What is claimed is:

1. A diaphragm valve comprising a body including a fluid passage therethrough, a valve seat in said body, a bonnet including a circular flange, a flange on said body cooperating with the flange on said bonnet, a spindle mounted for longitudinal movement relative to the axis thereof in said bonnet for movement in a direction generally perpendicular to the passage through said body, a movable gate member mounted for movement by said spindle in a position to enter said passage and control the flow therethrough, a deformable diaphragm having its outer periphery secured between said body and said bonnet and its inner periphery engaging the gate member for movement therewith, said diaphragm presenting an annular portion between the outer periphery and the gate member having a cross section substantially in the form of a pair of inverted U's for all positions of the gate member, a guide member coupled for movement along with said gate member at a modified rate of movement which follows the natural deformation of the diaphragm when the gate member is moved, a shaped diaphragm follower guide affixed to the guide member for movement therewith having a generally inverted U-shape surface of revolution defining an arcuate surface continuously engaging the annular portion of the diaphragm in rolling contact, said shaped follower guide extending between and contacting the diaphragm and the gate member and overlapping any space introduced between the relatively movable guide and gate members throughout all positions to prevent frictional contact between the gate member and the diaphragm.

2. A valve according to claim 1 further comprising a spindle sleeve mounted on said spindle and means on said spindle for preventing translation of the sleeve relative to the spindle while permitting relative rotation therebetween, linkage means connected to said sleeve for controlling the motion of said guide means in a manner proportional to the translation of said gate member.

3. A valve according to claim 2 wherein said last-mentioned means comprises a lever connected to said bonnet and to said stem at the terminal portions of said lever, said lever being connected to said guide member at a point intermediate said lever whereby movement of said spindle in the direction of the axis of the spindle causes a proportional movement of said guide member.

4. A valve according to claim 3, including a spindle adapter connected to said spindle adjacent said guide means to permit rotation of said adapter relative to said spindle while preventing translation of said adapter relative to said spindle, said lever having one terminal portion connected to said adapter.

5. A valve as defined in claim 1, wherein the diaphragm has radial ribs on the surface contacting the guide member whereby the ribs engage the arcuate surface of the guide member.

6. A valve as defined in claim 1, wherein the guide is a shaped insert affixed to the guide member for movement therewith.

7. A valve as defined in claim 1 wherein the diaphragm defines a fluid seal between said passage and said bonnet.

8. A valve as defined in claim 1, wherein the diaphragm encloses the gate member.

References Cited in the file of this patent

UNITED STATES PATENTS

| | | |
|---|---|---|
| 2,765,811 | McClure | Oct. 9, 1956 |
| 2,913,012 | McCurley | Nov. 17, 1959 |

FOREIGN PATENTS

| | | |
|---|---|---|
| 652,296 | Great Britain | Apr. 18, 1951 |
| 996,800 | France | Sept. 5, 1951 |
| 1,237,441 | France | June 20, 1960 |